United States Patent [19]

Yamaguchi

[11] Patent Number: 5,060,540
[45] Date of Patent: Oct. 29, 1991

[54] LINE PRESSURE CONTROL BASED ON LEARNING OF QUALITY OF SHIFTING IN AUTOMATIC TRANSMISSION

[75] Inventor: Hiroshi Yamaguchi, Yokohama, Japan

[73] Assignee: Nissan Motor Co., Ltd., Yokohama, Japan

[21] Appl. No.: 510,553

[22] Filed: Apr. 18, 1990

[30] Foreign Application Priority Data

May 19, 1989 [JP] Japan .................................. 1-126230

[51] Int. Cl.⁵ .............................................. B60K 41/16
[52] U.S. Cl. ........................................................ 74/866
[58] Field of Search ........................................... 74/866

[56] References Cited

U.S. PATENT DOCUMENTS

| | | | |
|---|---|---|---|
| 4,283,970 | 8/1981 | Vukovich | 74/866 |
| 4,393,732 | 7/1983 | Suzuki et al. | 74/866 |
| 4,635,508 | 1/1987 | Tatsumi | 74/866 |
| 4,653,350 | 3/1987 | Downs et al. | 74/864 |
| 4,680,992 | 7/1987 | Hayasaki et al. | 74/869 |
| 4,742,461 | 5/1988 | Eschrich et al. | 364/424.1 |
| 4,833,613 | 5/1989 | Mack et al. | 74/866 X |
| 4,843,915 | 7/1989 | Sugimura et al. | 74/866 X |
| 4,942,530 | 7/1990 | Boda et al. | 74/866 X |

OTHER PUBLICATIONS

"Service Manual for Automatic Transmission of the RE4R01A Type", (A261C07) Published Mar. 1987 by Nissan Motor Company Ltd.

Primary Examiner—Allan D. Herrmann
Assistant Examiner—Ryan W. Massey
Attorney, Agent, or Firm—Foley & Lardner

[57] ABSTRACT

A motor vehicle with a line pressure control comprises a group of sensors and an A/D converter. When one of the group of sensors and the A/D converter malfunctions, the result of learning is not employed for adjusting the magnitude of a line pressure.

3 Claims, 7 Drawing Sheets

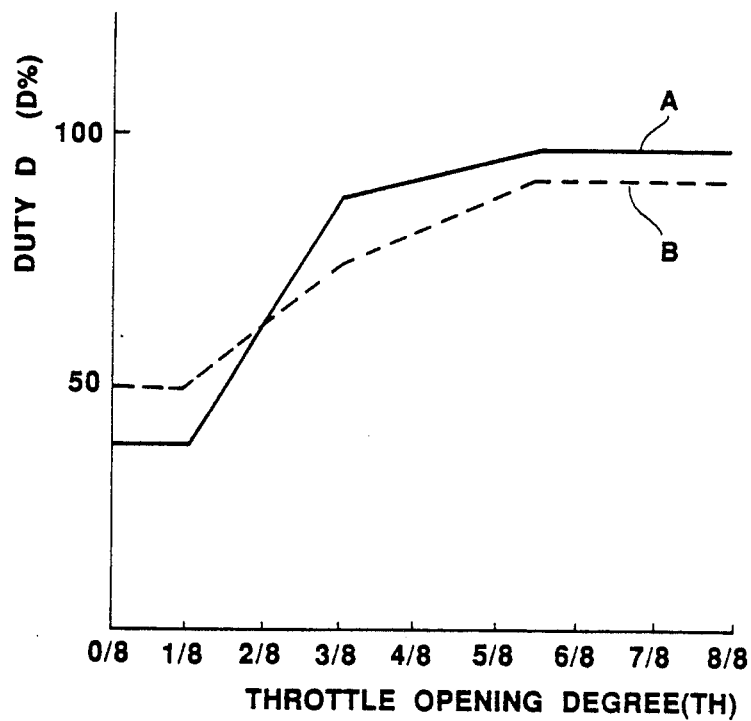
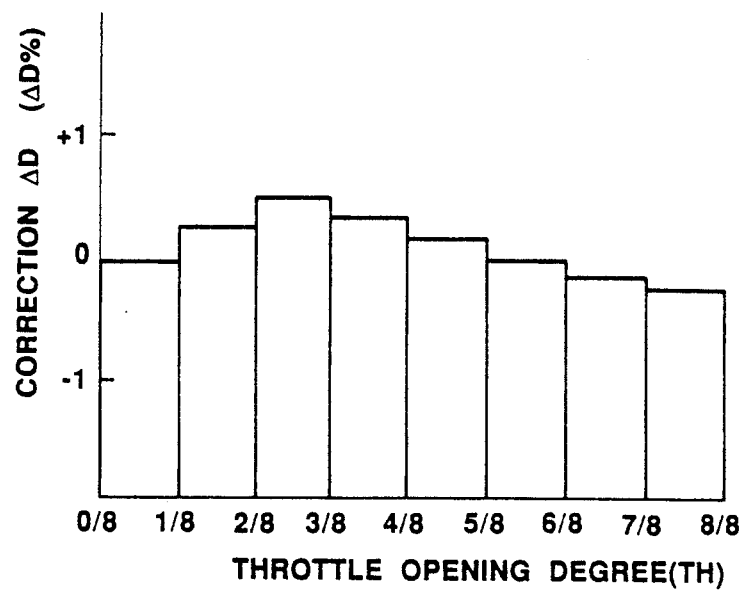

LINE PRESSURE CONTROL BASED ON LEARNING OF QUALITY OF SHIFTING IN AUTOMATIC TRANSMISSION

RELATED CO-PENDING APPLICATIONS

The following co-pending U.S. Patent Applications are related to the present application:

U.S. patent application Ser. No. 07/289,050 filed on Dec. 23, 1988 by Hiroshi YAMAGUCHI, now U.S. Pat. No. 4,981,053. This U.S. Patent Application corresponds to European Patent Application No. 88 121 587.5 filed on Dec. 23, 1988 and published under publication No. 0 323 618 on July 12, 1989.

U.S. patent application Ser. No. 07/306,606 filed on Feb. 6, 1989 by Akihiko SANO, now U.S. Pat. No. 4,982,621.

U.S. patent application Ser. No. 07/336,430 filed on Apr. 11, 1989 by Yasushi NARITA: This U.S. Patent Application corresponds to European Patent Application No. 89 106 419.8 filed on Apr. 11, 1989.

U.S. patent application Ser. No. 07/337,869 filed on Apr. 14, 1989 by Yasushi NARITA, new U.S. Pat. No. 4,955,259. This U.S. Patent Application corresponds to European patent application No. 89 106 797.7 filed on Apr. 17, 1989.

U.S. patent application Ser. No. 07/382,120 filed on July 19, 1989 by Yasushi NARITA. This U.S. Patent Application corresponds to European Patent Application No. 89 113 253.2 filed on July 19, 1989.

U.S. patent application Ser. No. 07/510,554 concurrently filed with the present application by the same applicant, Hiroshi YAMAGUCHI, on Apr. 18, 1990.

BACKGROUND OF THE INVENTION

The present invention relates to a motor vehicle with a line pressure control for an automatic transmission, and more particularly to a line presure control during occurrence of a shifting between one gear ratio and another gear ratio in an automatic transmission.

In the automatic transmission, a desired gear ratio is established by hydraulically activating selected one or ones of various friction devices (such as clutches and brakes) by line pressure, and a shift between two gear ratios is effected by changing friction device or devices to be activated If the line pressure is excessively high, transient engagement capacity of a friction device becomes excessively high, causing great shock to occur, whereas if the line pressure is excessively low, the transient engagement capacity of the friction device becomes excessively low, causing a slip to occur, thus shortening an operating life of the friction device. Thus, the line pressure has to be appropriately controlled. Conventionally, as described in the publication entitled "SERVICE MANUEL FOR AUTOMATIC TRANMISSION OF THE RE4R01A TYPE" (A261C07) published in March 1987 by NISSAN MOTOR COMPANY, LIMITED, a drain circuit of a line pressure regulator valve is opened or closed by a line pressure solenoid of the duty cycle type. The duty varies from 0% to 100%. When the duty is 0%, the line pressure solenoid is left OFF, closing the drain circuit, while when the duty is 100%, the line pressure solenoid is left ON, opening the drain circuit. Thus, increasing the duty causes the line pressure regulator to increase a magnitude of a line pressure generated thereby. Various values of the duty are contained in a table data in a ROM of a microcomputer of an automatic transmission control unit. Different table data are provided as shown in FIG. 5, one (curve A) for use at shifting operation. another (curve B) for normal stable non-shifting operation, for example. The duty values are arranged in each table data as being retrievable by table look-up operation using a variable such as a throttle opening degree.

However, this conventional line pressure control system cannot cope with a sitauation where the line pressure solenoid has a manufacturing variation or the characteristic of the line pressure solenoid degrades with time or a situation where the friction device has a manufacturing variation or the frictional material of the friction device degrades with time. In the former situation, even if the line pressure solenoid is subject to the same duty, the magnitude of line pressure deviates from a target value. In the latter situation, even if the magnitude of line pressure is adjusted to the target value, the friction device does not show a desired performance characteristic. Thus, in any event, the conventoinal line pressure control system fails to avoid occurrence of substantial shift shock or reduction in operating life of the friction device.

When a shift solenoid is switched from ON state to OFF state at a time in a manner to effect a 1-2 upshift of the automatic transmission, a level of pressure for second gear operation increases so as to induce the engagement of a given friction device. This produces a change in a rotational speed ratio of a transmission input shaft to a transmission output shaft from a value corresponding to a first gear to that which corresponds to the second gear. A process of the change in the rotational speed ratio at a low line pressure level is different from that at a high line pressure level. Accordingly, it is possible to determine from a time required for the change in the rotational speed ratio, viz., the duration of an inertia phase, whether the actual line pressure is adequate or not. Thus, a line pressure control system is proposed in the co-pending U.S. patent application Ser. No. 07/289,050, in which the duration of inertia phase is measured during shifting, and the measured duration is compared with a target value. A correction value, which is obtained from the difference between the two, is used for adjusting the line pressure during the next shifting.

With such line pressure control system based on the result from learning, however, if the result from learning is kept employed when one of a group of sensors such as a vehicle speed sensor and a throttle sensor, and an analog-to-digital (A/D) converter malfunctions, the line pressure control based on result from learning may degrade quality of shifting.

The present invention aims at improving a line pressure controlin a motor vehicle such that the result of learning is not employed for line pressure control when one of a group of sensors, and an A/D converter malfunctions.

SUMMARY OF THE INVENTION

According to the present invention, there is provided, in a motor vehicle having an internal conbustion engine, and an automatic transmission including a transmission output member and a transmission input member drivingly connected to the internal combusion engine, the automatic transmission being shiftable between one gear ratio and another gear ration and including a friction device which is adapted to be engaged in response to a magnitude of a line pressure to effect a shifting between the one and another gear ratios:

a group of sensor means, each for detecting one of operating variable of the internal combustion engine and the automatic transmission and generating a sensor output signal indicative of said operating variable detected;

a transmission control unit operatively coupled with said group of sensor means and including means for converting said sensor output signals into forms ready for processing in controlling the automatic transmission;

said transmission control unit containing a line pressure data containing a magnitude of the line pressure to be supplied to the friction device during the shifting;

said transmission control unit including, means for determining whether said group of sensors and said converting means malfunction or not upon occurrence of the shifting and generating an abnormality indicative signal when at least one of said group of sensors and said converting means malfunctions;

means for evaluating quality of the shifting after said occurrence of the shifting, means for correcting said line presure data in response to result of evaluating the quality of the shifting when a predetermined condition is satisfied upon absence of said abnormality indicative signal, but leaving said line pressure data unchanged when said abnormality indicative signal is present;

means for adjusting the magnitude of the line pressure supplied to engage the friction device in accordance with said line pressure data upon the next occurrence of the shifting.

According to another aspect of the present invention, there is provided, in a motor vehicle having an internal combustion engine, and an automatic transmission including a transmission output member and a transmissio input member drivingly connected to the internal combustion engine, the automatic transmission being shiftable between one gear ration and another gear ratio and including a friction device which is adapted to be engaged in response to a magnitude of a line pressure to effect a shifting between the one and another gear ratios:

a group of sensor means, each for detecting one of operating variable of the internal combustion engine and the automatic transmission and generating a sensor output signal indicative of said operating variable detected;

said group of sensor means including, input sensor means for detecting a revolution speed of the transmission input member and generating a first sensor output singal indicative of said revolution speed of the transmisison input member detected;

output sensor means for detecting a revolution speed of the transmission output member and generating a second sensor output signal indicative of said revolution speed of the transmission output member detected;

a transmission control unit operatively coupled with said group of sensor means and including means for converting said sensor output signals into forms ready for processing in controlling the automatic transmission;

said transmission control unit including, means for determining whether said group of sensors and said converting means malfunction or not upon occurrence of the shifting and generating an abnormality indicative signal when at least one of said group of sensors and said converting means malfunctions;

means responsive to said first and second sensor output signals for determining an actual gear ratio of said revolution speed of the transmission input member to said revolution speed of the transmission output member, means for setting a predetermined range determined in view of the one and another gear ratios, means for repeatedly checking whether or not said actual gear ratio determined falls in said predetermined range and incrementing a timer when said actual gear ratio falls in said predetermined range, means for comparing the content of said timer with a predetermined value after the completion of the shifting at least upon absence of said abnormality indicative signal; and mans for adjusting the magnitude of the line pressure which engages the friction device upon the next occurrence of the shifting in response to result from comparing the content of said timer with said predetermined value.

According to still another aspect of the present invention, there is provided a line pressure control method in a motor vehicle having an internal combustion engine, and an automatic transmission including a transmission output memeber and a transmission input member drivingly connected to the internal combusion engine, the automatic transmission being shiftable between one gear ration and another gear ratio and including a frction device which is adapted to be engaged in response to a magnitude of a line pressure to effect a shifting between the one and antother gear ratios, the motor vehicle also having a group of sensor means, each for detecting one of operating variables of the internal combustion engine and the automatic transmission and generating a sensor output signal indicative of the operating variable detected, and a transmission control unit operatively coupled with the group of sensor means and including means for converting the sensor output signals into forms ready for processing in controlling the automatic transmission and means for storing a line pressure data, the group of sensor means including, input sensor means for detecting a revolution speed of the transmission input member and generating a first sensor output signal indicative of said revolution speed of the transmission input member detected, output sensor means for detecting a revolution speed of the transmission output member and generating a second sensor output signal indicative of said revolution speed of the transmission output member detected, the line pressure control method comprising the steps of:

determining whether said group of sensors and said converting means malfunction or not upon occurrence of the shifting and generating an abnormality indicative signal when at least one of said group of sensors and said converting means malfunctions;

detecting a revolution speed of the transmission input member and generating a first sensor output signal indicative of said revolution speed of the transmission input member detected;

detecting a revolution speed of the transmission output member and generating a second sensor output singal indicative of said revolution speed of the transmission detected;

determining responsive to said first and second sensor outpu signals an actual gear ration of said revolution speed of the transmission input member to said revolution speed of the transmission output member;

setting a predetermined range determined in view of the one and another gear ratios;

repeatedly checking whether or not said actual gear ration determined falls in said predetermined range and incrementing a timer when said actual gear ratio falls in said predetermined range;

comparing the content of said timer with a predetermined value after the completion of the shifting;

correcting the line pressure data in response to result from comparing the content of said timer with said predetermined value at leats upon absence of said abnormality indicative signal; and adjusting the magnitude of the line pressure which engages the friction device during the next occurence of the shifting in response to the line pressure data.

BRIEF DESCRIPTION OF THE DRAWINGS

FIG. 5 shows a characteristic of variation of duty ratio which a line pressure solenoid is subject to; and FIG. 6 is a diagram illustrating duty correctio values contained in a table data stored in a RAM.

DETAILED DESCRIPTION OF THE INVENTION

Referring to the accompanying drawings, the present invention is described.

Figure 1:
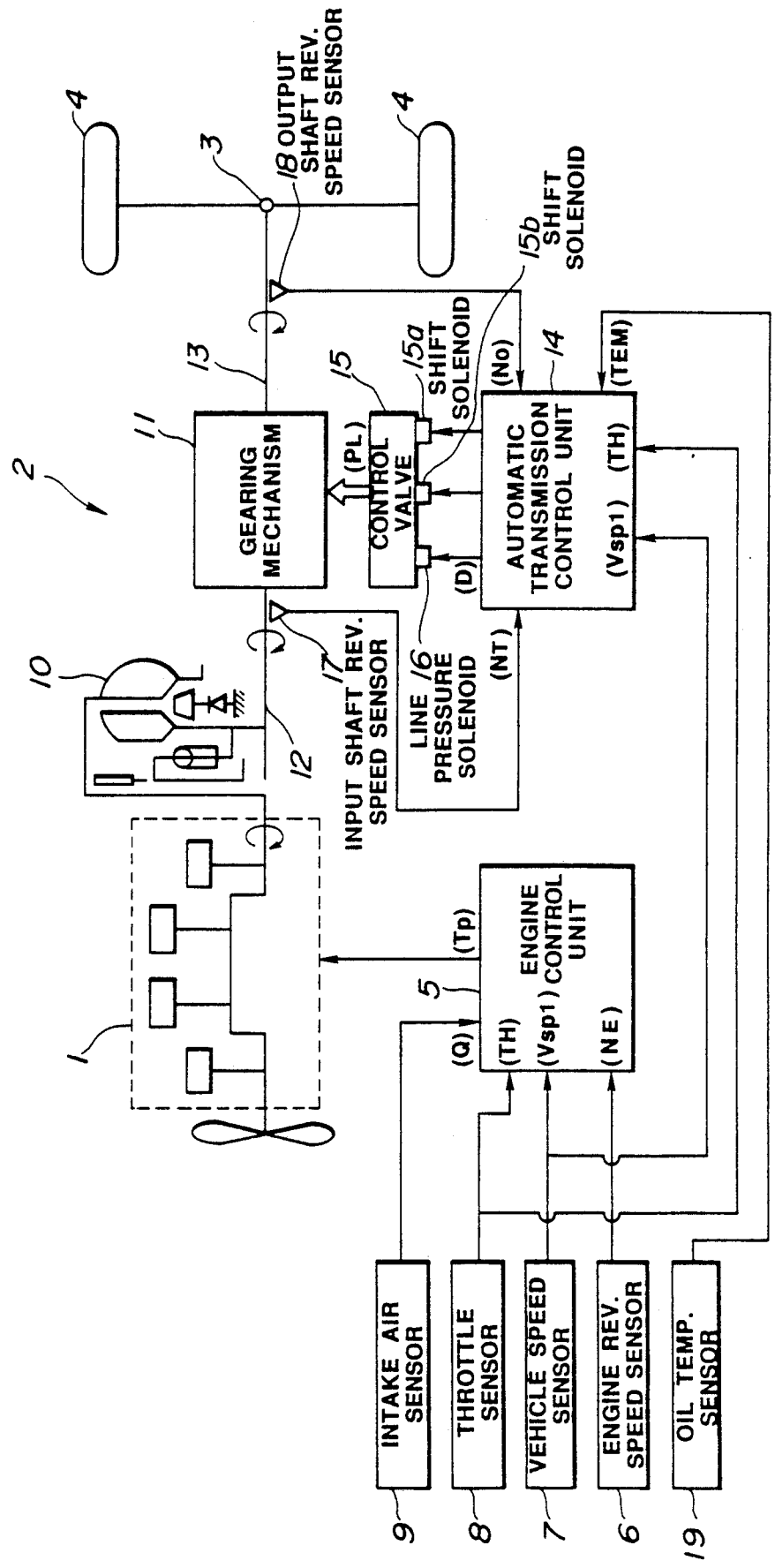
FIG. 1 is a block diagram of a motor vehicle incorporating a line pressure control system according to the present invention.

FIG. 1 shows a motor vehicle incorporating a line pressure control system. In FIG. 1, the reference number 1 designates an electronic fuel injection internal combusion engine, 2 an automatic transmission, 3 a differential gear, and 4 a pair of traction wheels.

The engine 1 is provided with a microcomputer based engine control unit 5. Supplied to the control unit 5 are output signals of an engine revolution speed sensor 6 arranged to detect an engine revolution speed $N_E$, a vehicle speed sensor 7 arranged to detect a vehicle speed V, a throttle sensor 8 aranged to detect an engine throttle opening degree TH, and an intake air sensor 9 arranged to detect an amount of an engine intake air Q. In the control unit 5, a width $T_P$ of a fuel injection pulse is determined based on various kinds of input information carried by these sensor ouput signals supplied. An ignition timing is determined also in the control unit 5. Output signals of the control unit 5 indicative of the pulse width $T_P$ and the ignition timing determined are supplied to the engine 1. Thus, the engine 1 is supplied with an amount of fuel corresponding to the fuel injection pulse width $T_P$ and operates on combustion of the fuel supplied.

The automatic transmission 2 includes a torque converter 10 and a change-speed gearing mechanism 11 arranged in tandem. The engine drive is delivered to a transmission input shaft 12 via the torque converter 10. An input revolution speed of the input shaft 12 is delivered to a transmission output shaft 13. A revolution of the output shaft 13 is transmitted to the pair of traction wheels 4.

The change-speed gearing mechanism 11 involves various friction devices, such as clutches and brakes, which are selectively activated by a line pressure $P_L$ to establish a desired gear ratio. A shift between two gear ratios is effected by changing the friction device or devices to be activated.

In order to control a gear ratio change in the change-speed gearing mechanism 11, a microcomputer based automatic transmission control unit 14, and a control valve assembly 15 are provided. The control valve assembly 15 includes a shiftg solenoid 15a and a shift solenoid 15b. These shift solenoids 15a and 15b are selectively energized and thus rendered ON. In response to various combinations of ON state and OFF state of these shift solenoids 15a and 15b, the line pressure $p_L$ is supplied to the various friction devices, selectively, to establish a gear ratio corresponding to an ON/OFF combination selected. The control valve assembly 15 also includes a duty solenoid 16 for controlling the line pressure $P_L$. This duty solenoide 16 is activated in accordance with a drive duty D supplied thereto and increases the magnitude of line pressure $P_L$ in response to an increase in the drive duty D. Supplied to the transmission control unit 14 are output signals of the vehicle speed sensor 7, the throttle sensor 8, an input revolution speed sensor 17 arranged to detect a revolution speed $N_T$ of the input shaft 12, an output revolution speed sensor 18 arranged to detect a revolution speed $N_O$ of the output shaft 13, and a hydraulic fluid temperature sensor 19 arranged to detect a temperature TEM of hydraulic fluid used in the automatic transmission 2.

The transmission control unit 14 includes a ROM (Read Only Memory) which stores control programs illustrated by the flowcharts shown in FIGS. 2 to 4d and effects a line pressure control and a ratio change control.

The transmission 2 including the change-speed gearing mechanism 11 and the control valve assembly 15 with two shift solenoids 15a and 15b and line pressure solenoid 16 is well known and described in detail in the before mentioned publication entitled "SERVICE MANUAL FOR AUTOMATIC TRANSMISSION OF THE RE4R01A TYPE" (A261C07) published in March 1987 by NISSAN MOTOR COMPANY, LIMITED. In order to fully understand how a gear ratio change is carried out by the two shift solenoids 15a and 15b and how the magnitude of line pressure is adjusted by the line pressure solenoid 16, reference should be made to U.S. Pat. No. 4,680,992, issued to Hayasaki et al. on July 21, 1987, which has been herein incorporated by reference in its entirety (see shift colenoid 42 and 44, and a line pressure solenoid 24 in FIGS. 1A, 1B and 1C.

Figure 2:
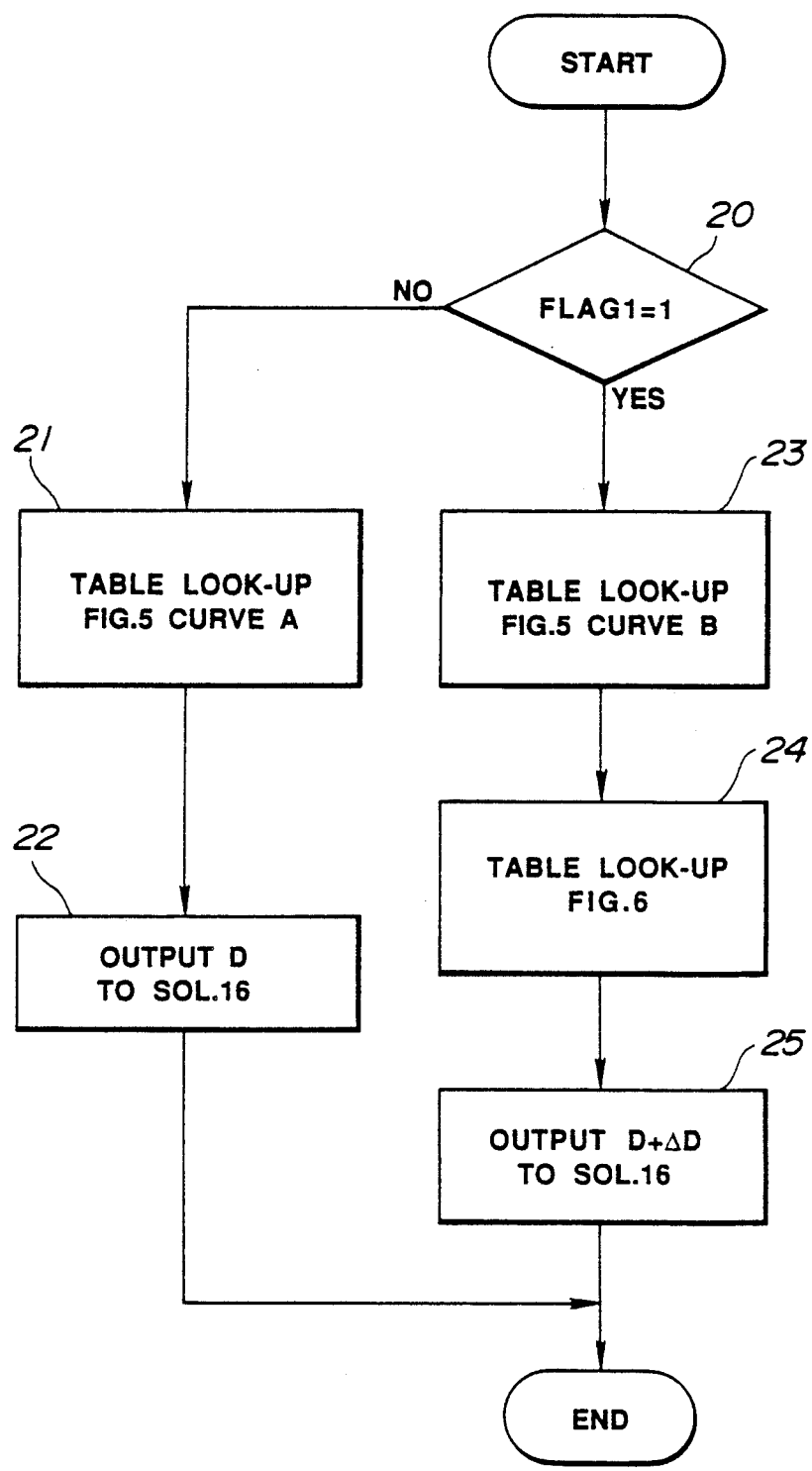
FIGS. 2 to 4d are flowcharts of a line pressure control program and a shift control program.

Referring to FIG. 2, the line pressure control is explained. The execution of this line pressure control is initiated by a timer interruption. In FIG. 2, at a step 20 it is checked whether a flag FLAG1 is equal to 1 or not. The FLAG1 is equal to 1 when the change-speed gearing mechanism 11 is shifting, while the FLAG1 is not equal to 1 when it is not shifting. Thus, when the change-speed gearing mechanism 11 is not shifting, the control proceeds from the step 20 to a step 21 where a table llok-up operation is performed using a throttle opening degree TH to obtain a duty D which the line pressure solenoid 16 is subjec to from a table data for non-shifting as illustrated by a fully drawn characteristic curve A in FIG. 5, which duty D corresponds to the throttle opening degree TH. Then, at a step 22, this duty D obtained at the step 21 is outputted to the line pressure solenoid 16. As a result, the line pressure $P_L$ is adjusted to an appropriate value for non-shifting operation.

When the change-speed gearing mechanism 11 is shifting, the answer to the inquiry made at the step 20 is YES and the control proceeds to a step 23. At the step 23, there is performed a table look-up operation of a table data as illustrated by broken line drawn curve B in FIG. 5 using the throttle opening degree TH to obtain a duty D for line pressure control, which duty D corresponds to the throttle opening degree TH. At the subsequent step 24, a table look-up operation of a table data shown in FIG. 5 is performed using the throttle opening degree TH to obtain a duty correction value $\Delta D$ (delta D) corresponding to the throttle opening degree TH. The table data as illustrated in FIG. 6 are stored in a RAM (Random Access Memory) of the transmission control unit 14 and contains various duty correction values which are updated after learning control which will be later described. Then, the control proceeds to a step 25 where a sum $D + \Delta D$ (delta D) is outputted to the line pressure solenoid 16. As a result, the line pressure $P_L$ is adjusted to the appropriate value for shifting operation.

Figure 3:
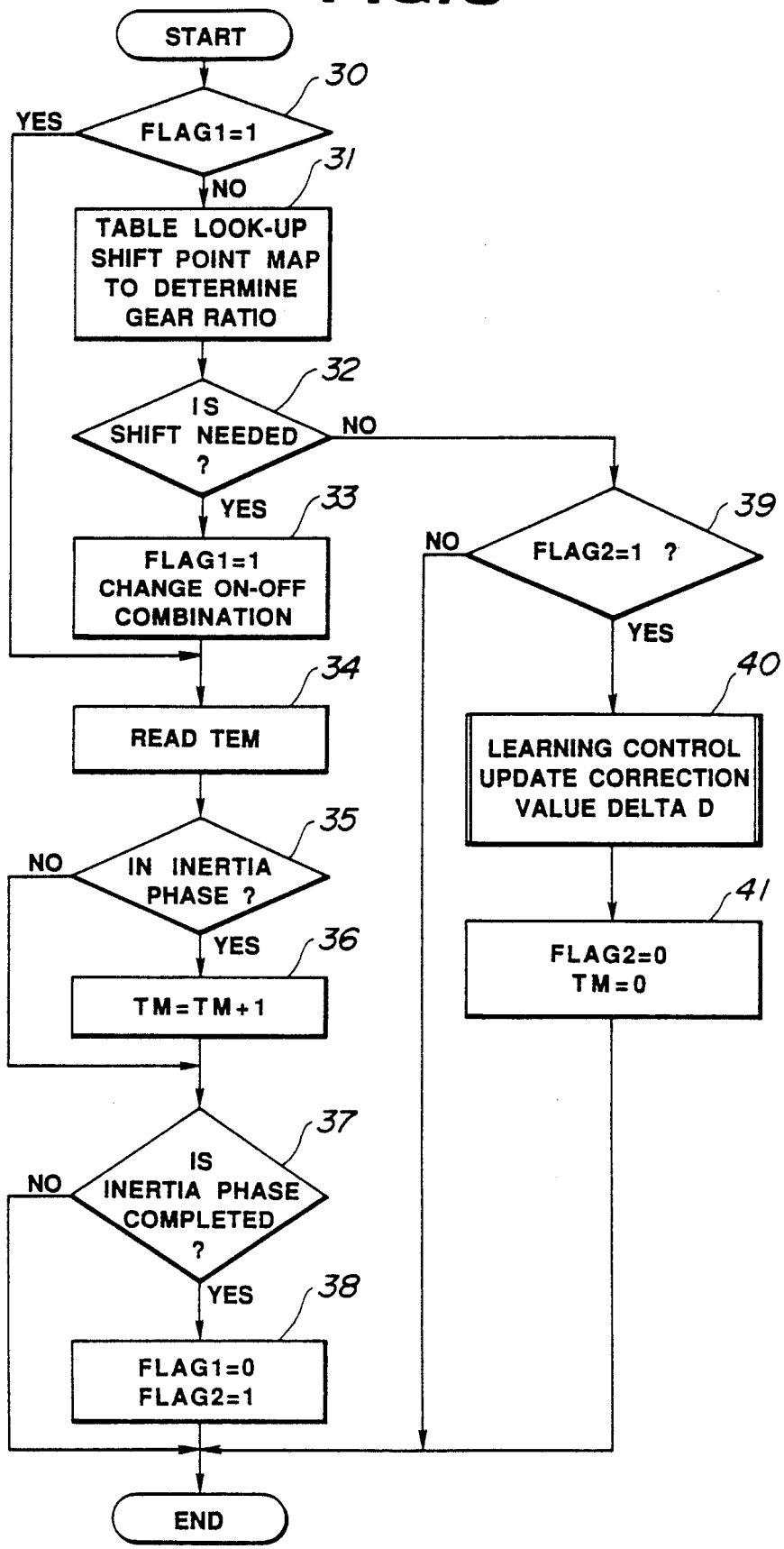

FIG. 3 shows a control program for effecting a ratio change control and a line pressure solenoid duty correction value control. The execution of this control program is initiated by a time interruption. In FIG. 3, at a step 30, it is checked whether the flag FLAG1 is equal to 1 or not. If the change-speed gearing mechanism 11 is not shifting and thus the flag FLAG1 is not equal to 1, the control proceeds from the step 30 to a step 31. At the step 31, using a predetermined shift schedule diagram, a desired gear ratio is determined which corresponds to vehicle speed V and throttle opening degree TH. Then, the control proceeds to a step 32 where it is judged whether a shifting is needed or not based on whether a current gear ratio is the same as the required gear ratio determined at the step 31 or not. If a shift is needed and thus the answer to the inquiry at the step 32 is YES, the control proceeds from this step 32 to a step 33. At the step 33, the flag FLAG1 is set equal to 1 and an ON/OFF combination of the shift solenoids 15a and 15b is changed to establish the required gear ratio in the change-speed gearing mechanism 11. In the next and subsequent run, the steps 31, 32 and 33 are skipped as long as the flag FLAG1 continues to be equal to 1.

At the subsequent step 34, the temperature TEM of hydraulic fluid of the automatic transmission 2 is read. Then, the control proceeds to a step 35 where it is checked whether an actual gear ratio $N_T/N_O$ falls in a predetermined range determined in view of a gear ratio before the shifting and a gear ratio upon completion of the shift or not. In this case, it is recognized that the inertia phase proceeds when the answer to the inquiry at the step 35 is YES. If the answer to the inquiry at the step 35 is YES, the control proceeds to a step 36 where an increment is made to a timer TM. Upon termination of the inertia phase, the control proceeds from the step 35 to a step 37 bypassing the step 36. It will now be noted that the content of the timer TM represents a period of time when the inertia phase proceeds, viz., an inertia phase time.

At the subsequent step 37, it is checked whether the inertia phase is completed or not. This step is cooperating with the step 35 such that the answer to the inquiry at the step 37 becomes NO when the answer to the inquiry at the step 35 is YES, while the answer to the inquiry at the step 37 becomes YES when the answer to the inquiry at the step 35 is NO. Thus, when the inertia phase is completed, the control proceeds from the step 37 to a step 38 where the flag FLAG1 is reset to 0 (zero) and a flag FLAG2 is set equal to 1. This flag FLAG2 indicates whether a learning control which will be later described is to be executed or not.

In the next run after completion of the shifting, the control proceeds from the step 32 to a step 39. At the step 39, it is checked whether the flag FLAG2 is set equal to 1 or not. In this situation, the control proceeds from the step 39 to a step 40 where the learning control program which will be described hereinbelow in connection with FIG. 4 is effected to update the duty correction data $\Delta D$ (delta D) illustrated in FIG. 6. At the subsequent step 41, the flag FLAG2 and the timer TM are cleared.

Figure 4A:
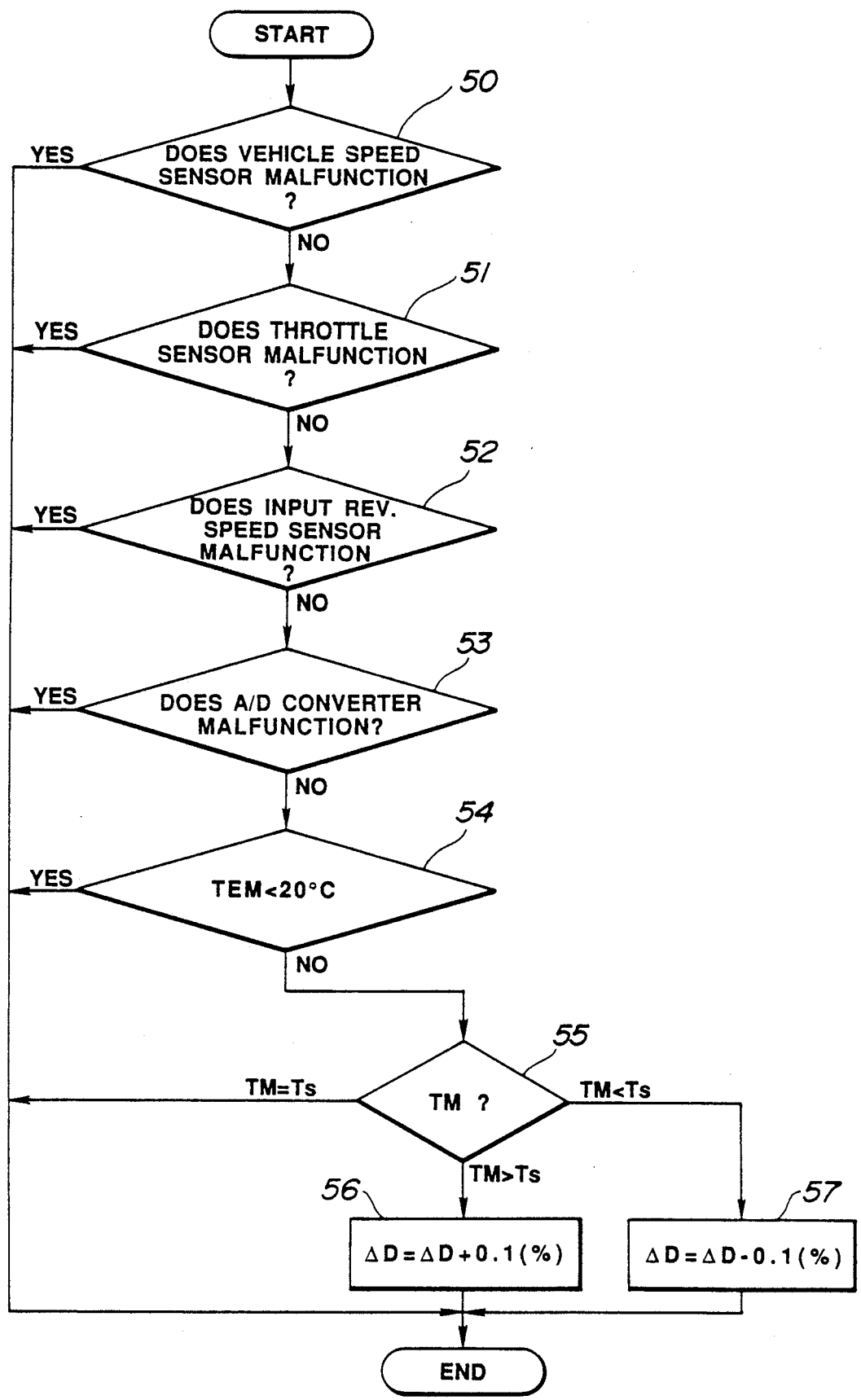

Referring to FIG. 4a, the execution of this program is initiated. In FIG. 4, at a step 50, it is checked whether the vehicle speed sensor 7 malfunctions or not. If the answer to the inquiry at the step 50 is NO, the control proceeds from the step 50 to a step 51. At the step 51, it is checked whether the throttle sensor 8 malfunctions or not. If the answer to the inquiry at the step 51 is NO, the control proceeds to a step 52 where it is checked whether the input revolution speed sensor 17 malfunctions or not. Also, at the subsequent step 53, a check similar to the step 52 is carried out for determining if an analog-to-digital (A/D) converter (no numeral) malfunctions. If the answers to the inquiries at the steps 52 and 53 are both NO, the control proceeds to a step 54. At the step 54, it is checked whether the temperature TEM of hydraulic fluid is lower than a predetermined value of 20° C., for example, or not. When the temperature TEM is not lower than 20° C., the control proceeds to a step 55 where the inertia phase time TM is checked. If the inertia phase time TM is equal to a predetermined value $T_S$ where the appropriate magnitude of line pressure is provided, the RAM data containing various correction values $\Delta D$ (delta D) shown in FIG. 6 are not modified. Thus, the current RAM data are used for the line pressure control for a shifting which is to take place next time. The predetermined value $T_S$ mentioned above differs from one kind of shifting to another and it differs depending on the throttle opening degree even with the same kind of shifting.

However, if the inertia phase time TM is greater than the predetermined value $T_S$ and thus the line pressure was relatively low to invite shortening of operating life of the friction device, the control proceeds from the step 55 to a step 56 where the correction value $\Delta D$ (delta D) in the RAM data is increased by 0.1%. Thus, the magnitude of line pressure during the next shifting will be increased in accordance with this increase since the duty $D + \Delta D$ (delta D) has been increased.

If the inertia phase time TM is less than the predetermined value $T_S$, the control proceeds from the step 55 to a step 57 since in the situation the line pressure is excessively high so that the engagement capacity of the friction device becomes excessively large to result in producing substantially great shock. At the step 57, the correction value $\Delta D$ (delta D) at the RAM data is decreased by 0.1% and used for the next shifting. Therefore, the magnitude of line pressure is decreased during the next shifting, preventing the occurrence of shift shock.

As will now be understood from the previous description, the magnitude of line pressure is kept at the most appropriate value by correcting data which the magnitude of line pressure is determined on by learning wherein the data is corrected in such a direction as to hold the inertia phase time TM at the predetermined value $T_S$. Thus, a shock-free shifting without any reduction in operating life of the friction device is assured even in a situation where there are manufacturing variations and/or degradation with time of component parts.

If the answers to the inquiries at the steps 50 to 53 are YES, or that it is determined at the step 54 that the temperature TEM is lower than 20° C., the control comes to an end. The RAM data containing various correction values ΔD (delta D) shown in FIG. 6 are not modified, and the current RAM data are used for the line pressure control for a shifting which is to take place next time, thus inhibiting the learning control. As a result, even if one of the sensors 7, 8, 17, and the A/D converter malfunctions, or that a system including the line pressure solenoid 16 is unstable at the low temperature TEM, the inhibition of the learning control can prevent the line pressure control from being incorrect.

Figure 4B:
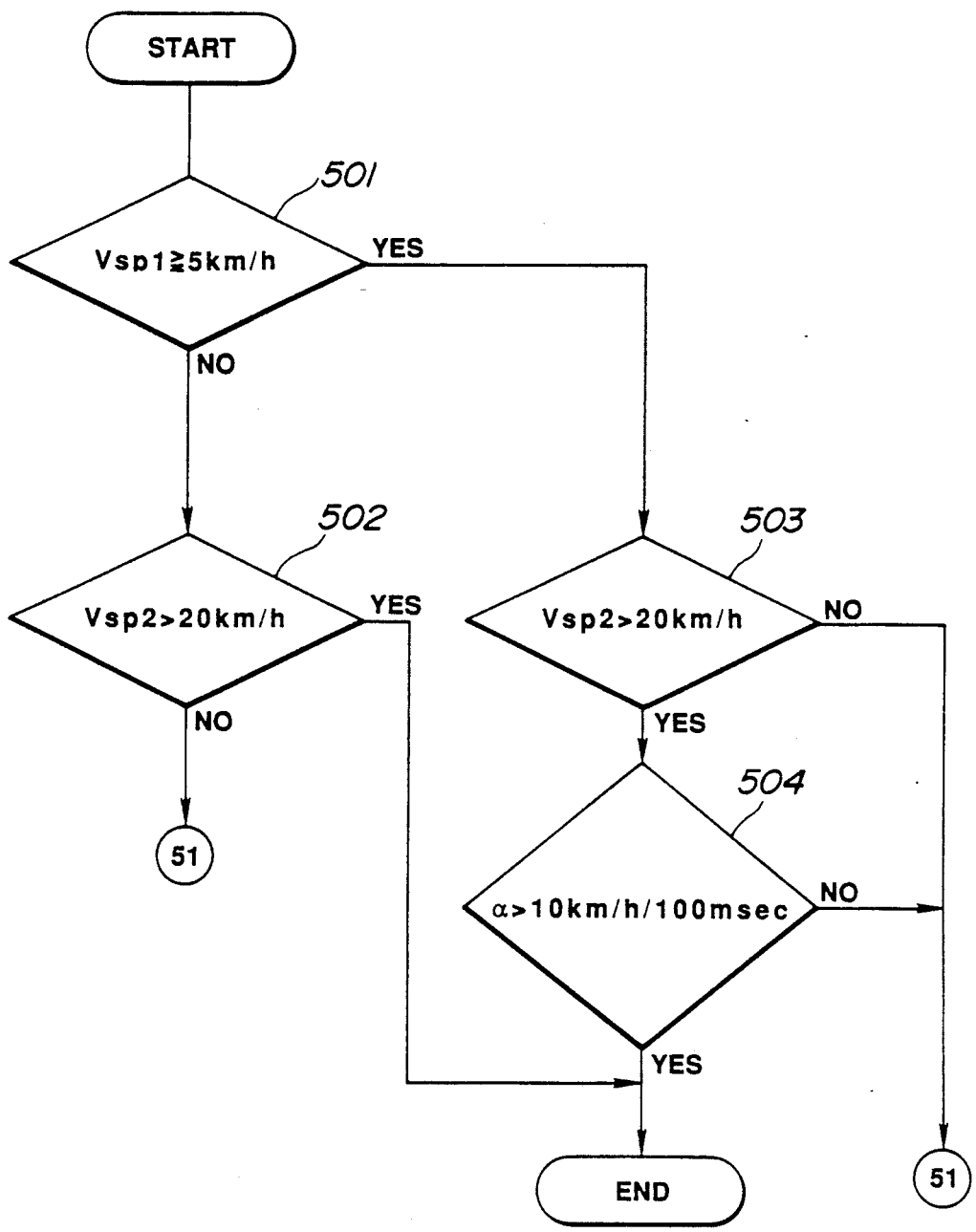

FIG. 4b shows a subprogram at the step 50 for determining if the vehicle speed sensor 7 malfunctions. The determination is taken place by comparing a signal indicative of a vehicle speed $V_{SP}1$ from the vehicle speed sensor 7 and a signal indicative of a vehicle speed value $V_{SP}2$ from the output revolution speed sensor 18 with predetermined values. This subroutine starts with the signals reset to 0 (zero). At a step 501, it is checked whether the vehicle speed $V_{SP}1$ is less than, for example, 5 Km/h or not. If $V_{SP}1 < 5$ Km/h, the control proceeds from the step 501 to a step 502 where it is checked whether the vehicle speed value $V_{SP}2$ is more than, for example, 20 Km/h or not. At the step 502, if $V_{SP}2 > 20$ Km/h, it is determined that the vehicle sensor 7 malfunctions, whereas if $V_{SP}2 \leq 20$ Km/h, it is determined that the vehicle speed sensor 7 is in normal operation. On the other hand, at the step 501, if $V_{SP}1 \geq 5$ Km/h, the control proceeds to a step 503 where it is checked whether the vehicle speed value $V_{SP}2$ is more than 20 Km/h. At the subsequent step 504, it is checked whether a differential value of the vehicle speed $V_{SP}1$, viz., a reduction degree $\alpha$ (alpha) derived from $V_{SP}1/100$ msec is more than, for example, 10 Km/100 msec or not. If the answers to the inquiries at the steps 503 and 504 are YES, it is determined that the vehicle speed sensor 7 malfunctions. If the answers to the inquiries at the steps 503 and 504 are NO, it is determined that the vehicle speed sensor 7 is in normal operation, and the control proceeds to the step 51.

Figure 4C:
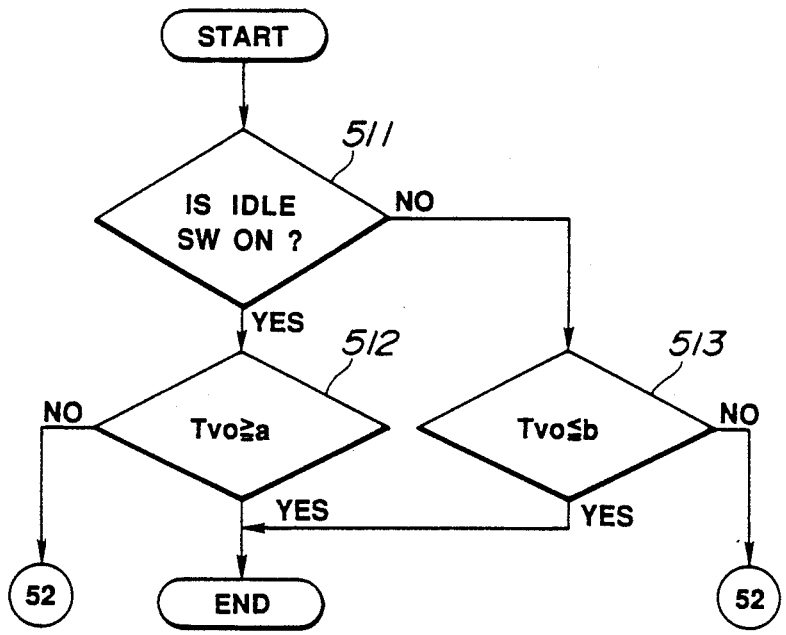

FIG. 4c shows a subprogram at the step 51 for determining if the throttle sensor 8 malfunctions. At a step 511, it is checked whether the engine 1 is idling or not by examining an ON-OFF state of an idle switch. When the engine 1 is idling, viz., the idle switch is ON, the control proceeds from the step 511 to a step 512. At the step 512, it is checked whether a throttle opening degree $T_{VO}$ of the throttle sensor 8 is larger than a predetermined value a or not. If $T_{VO} \geq a$, viz., the throttle opening degree $T_{VO}$ is larger even though the engine 1 is idling, it is determined that the throttle sensor 8 malfunctions. Reversely, if $T_{VO} < a$, it is determined that the throttle sensor 8 is in normal operation, and the control proceeds from the step 512 to the step 52. On the other hand, at the step 511, if the idle switch is OFF, the control proceeds to a step 513 where it is checked whether the throttle opening degree $T_{VO}$ is smaller than a predetermined value b or not. It is to be noted that the value b is less than the value a. If $T_{VO} \leq b$, viz., the throttle opening degree $T_{VO}$ is smaller even though the engine 1 is not idling, it is determined that the throttle sensor 8 malfunctions, and the control proceeds from the step 513 to the step 52.

Figure 4D:
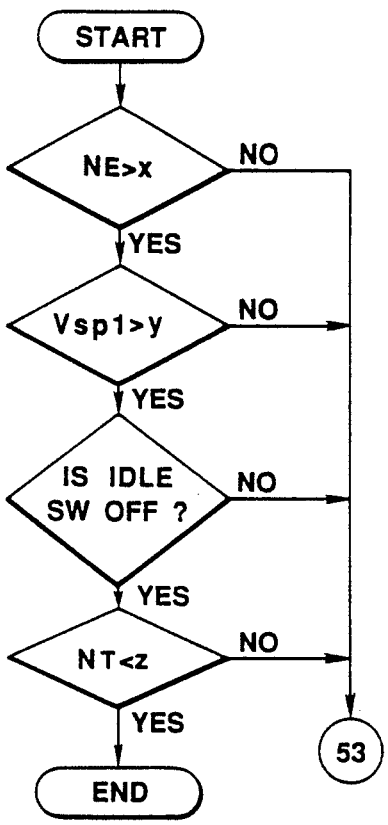

FIG. 4d shows a subprogram at the step 52 for determining if the input revolution speed sensor 17 malfunctions. The determination is taken place by comparing an engine speed $N_E$, the vehicle speed $V_{SP}1$, and an input revolution speed $N_T$ with predetermined values x, y, and z, and by checking whether the engine 1 is idling or not.

In order to determine at the step 53 if the A/D converter malfunctions, an output level at an end-of-conversion terminal ($\overline{EOC}$) of the A/D converter is detected after a sufficient lapse of time subsequent to a start-up of the A/D converter, viz., after an end of A/D conversion. If the output level is low (L), it is determined that the A/D converter is in normal operation, whereas if the level is high (H), it is determined that the converter malfunctions.

The subprograms described in connection with the steps 50 to 53 are given by way of example, and not limitative. Without executing all of the subprograms of the steps 50 to 53, it is possible to limit only one subprogram. If desired, a check on the temperature TEM of hydraulic fluid may be omitted.

What is claimed is:

1. In a motor vehicle having an internal combustion engine, and an automatic transmission including a transmission output member and a transmission input member drivingly connected to the internal combustion engine, the automatic transmission being shiftable between one gear ratio and another gear ratio and including a friction device which is adapted to be engaged in response to a magnitude of a line pressure to effect a shifting between the one and another gear ratios:

a group of sensor means, each for detecting one of operating variable of the internal combustion engine and the automatic transmission and generating a sensor output signal indicative of said operating variable detected;

said group of sensor means including, input sensor means for detecting a revolution speed of the transmission input member and generating a first sensor output signal indicative of said revolution speed of the transmission input member detected;

output sensor means for detecting a revolution speed of the transmission output member and generating a second sensor output signal indicative of said revolution speed of the transmission output member detected;

a transmission control unit operatively coupled with said group of sensor means and including means for converting said sensor output signals into forms ready for processing in controlling the automatic transmission;

said transmission control unit including, means for determining whether said group of sensors and said converting means malfunction or not upon occurrence of the shifting and generating an abnormality indicative signal when at least one of said group of sensors and said converting means malfunctions;

means responsive to said first and second sensor output signals for determining an actual gear ratio of said revolution speed of the transmission input member to said revolution speed of the transmission output member, means for setting a predetermined range determined in view of the one and another gear ratios, means for repeatedly checking whether or not said actual gear ratio determined falls in said predetermined range and incrementing a timer when said actual gear ratio falls in said predetermined range, means for comparing the content of said timer with a predetermined value after the completion of the shifting at least upon absence of said abnormality indicative signal; and means for adjusting the magnitude of the line pressure which engages the friction device upon the next occurrence of the shifting in response to result from comparing the content of said timer with said predetermined value.

2. A motor vehicle as claimed in claim 1, wherein said adjusting means include a line pressure solenoid, and said transmission control unit means contains first data, and second correction data, said transmission control unit means including means for controlling a drive signal supplied to said line pressure solenoid in response to a sum of said first data and said second correction data, and means for modifying said second correction data in response to said result from comparing the content of said timer with said predetermined value.

3. A line pressure control method in a motor vehicle having an internal combustion engine, and an automatic transmission including a transmission output member and a transmission input member drivingly connected to the internal combustion engine, the automatic transmission being shiftable between one gear ratio and another gear ratio and including a friction device which is adapted to be engaged in response to a magnitude of a line pressure to effect a shifting between the one and another gear ratios, the motor vehicle also having a group of sensor means, each for detecting one of operating variables of the internal combustion engine and the automatic transmission and generating a sensor output signal indicative of the operating variable detected, and a transmission control unit operatively coupled with the group of sensor means and including means for converting the sensor output signals into forms ready for processing in controlling the automatic transmission and means for storing a line pressure data, the group of sensor means including, input sensor means for detecting a revolution speed of the transmission input member and generating a first sensor output signal indicative of said revolution speed of the transmission input member detected, output sensor means for detecting a revolution speed of the transmission output member and generating a second sensor output signal indicative of said revolution speed of the transmission output member detected, the line pressure control method comprising the steps of:

determining whether said group of sensors and said converting means malfunction or not upon occurrence of the shifting and generating an abnormality indicative signal when at least one of said group of sensors and said converting means malfunctions;

detecting a revolution speed of the transmission input member and generating a first sensor output signal indicative of said revolution speed of the transmission input member detected;

detecting a revolution speed of the transmission output member and generating a second sensor output signal indicative of said revolution speed of the transmission detected;

determining responsive to said first and second sensor output signals an actual gear ratio of said revolution speed of the transmission input member to said revolution speed of the transmission output member;

setting a predetermined range determined in view of the one and another gear ratios;

repeatedly checking whether or not said actual gear ratio determined falls in said predetermined range and incrementing a timer when said actual gear ratio falls in said predetermined range;

comparing the content of said timer with a predetermined value after the completion of the shifting;

correcting the line pressure data in response to result from comparing the content of said timer with said predetermined value at least upon absence of said abnormality indicative signal; and adjusting the magnitude of the line pressure which engages the friction device during the next occurrence of the shifting in response to the line pressure data.

* * * * *